(12) United States Patent
Pohlmann

(10) Patent No.: US 12,438,447 B2
(45) Date of Patent: Oct. 7, 2025

(54) TOTEM POLE PFC WITH A SURGE PROTECTION CIRCUIT AND SURGE PROTECTION METHOD FOR A TOTEM POLE PFC

(71) Applicant: Delta Electronics (Thailand) Public Co., Ltd., Samutprakarn (TH)

(72) Inventor: Robert Pohlmann, Soest (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 231 days.

(21) Appl. No.: 18/346,843

(22) Filed: Jul. 4, 2023

(65) Prior Publication Data

US 2024/0014732 A1   Jan. 11, 2024

(30) Foreign Application Priority Data

Jul. 7, 2022 (EP) ..................... 22183677

(51) Int. Cl.
  *H02M 1/42*  (2007.01)
  *H02M 1/32*  (2007.01)
  *H02M 1/36*  (2007.01)

(52) U.S. Cl.
  CPC ........... *H02M 1/4216* (2013.01); *H02M 1/32* (2013.01); *H02M 1/36* (2013.01); *H02M 1/4233* (2013.01)

(58) Field of Classification Search
  CPC .... H02M 1/4216; H02M 1/42; H02M 1/4208; H02M 1/4225; H02M 1/4233; H02M 1/36; H02M 1/32; H02M 7/219
  See application file for complete search history.

(56) References Cited

U.S. PATENT DOCUMENTS

| 2012/0294053 | A1  | 11/2012 | Yan et al. |
| 2019/0006960 | A1* | 1/2019  | Benabdelaziz ....... H02M 7/797 |
| 2019/0319528 | A1* | 10/2019 | Matsuura .............. H02M 1/083 |

(Continued)

FOREIGN PATENT DOCUMENTS

| CN | 110034671 A | 7/2019 |
| CN | 113067458 B | 10/2021 |

(Continued)

OTHER PUBLICATIONS

Corresponding Japan office action issued on Sep. 2, 2024 with its translation. (6 pages).
The extended European search report issued on Dec. 19, 2022.

*Primary Examiner* — Alex Torres-Rivera
(74) *Attorney, Agent, or Firm* — CKC & Partners Co., LLC

(57) ABSTRACT

The disclosure concerns a totem pole PFC with a surge protection circuit, wherein the totem pole PFC comprises at least one bypass-diode branch with at least two bypass-diodes, at least one switch branch with at least two switches, at least one polarity changer branch with at least two switches, an input bridge connecting the switch branch(es) with an input voltage source, and at least one bypass branch connecting the input bridge in parallel with the bypass-diodes of the bypass-diode branch(es). The surge protection circuit comprises at least one current sensor configured to detect a current flowing through at least one of the bypass-diodes of the bypass-diode branch(es), and a control unit configured to receive a detected current value from the current sensor(s) and to switch at least one switch of the totem pole PFC at least in dependence on the detected current value.

18 Claims, 7 Drawing Sheets

(56) References Cited

U.S. PATENT DOCUMENTS

| | | | | |
|---|---|---|---|---|
| 2020/0161962 A1* | 5/2020 | Liu | ..................... | H02M 1/4208 |
| 2022/0255415 A1* | 8/2022 | Ishibashi | ............. | H02M 1/0009 |
| 2023/0275505 A1* | 8/2023 | Li | ...................... | H02M 1/4233 |
| | | | | 323/284 |

FOREIGN PATENT DOCUMENTS

| | | |
|---|---|---|
| CN | 114337235 A | 4/2022 |
| JP | 2005328624 A | 11/2005 |
| WO | 2019222965 A1 | 11/2019 |

* cited by examiner

TOTEM POLE PFC WITH A SURGE PROTECTION CIRCUIT AND SURGE PROTECTION METHOD FOR A TOTEM POLE PFC

CROSS-REFERENCE TO RELATED APPLICATION

This application claims priority to European Patent Application No. 22183677.8, filed on Jul. 7, 2022, which is hereby incorporated by reference in its entirety.

TECHNICAL FIELD

The present disclosure concerns a totem pole PFC (power factor correction circuit) with a surge protection circuit and a surge protection method for a totem pole PFC.

BACKGROUND

Conventional PFC power converters, known from for example US 2012/0294053A1 or US 2020/0161962A1, are generally used for reducing interference of an electric grid caused by power harmonic waves and decreasing the noise of the electric grid. Especially during initial product testing of the PFC, as well as during use thereof, a voltage supplied from an input voltage source, for instance the electric grid, can be prone to producing surge voltages. For such cases, surge protection circuits are commonly employed to protect the device from breakdown resulting from these surge voltages as well as their induced current. However, none of the conventional surge protection circuits suitably and reliably protect a totem pole PFC. In particular, conventional surge protection circuits provide no suitable surge protection for a totem pole PFC comprising a polarity changer.

SUMMARY

It is an object of the present disclosure to provide a totem pole PFC with a surge protection circuit which can suitably, reliably, and quickly react to surge voltages and protect the totem pole PFC. Further, it is an object of the present disclosure to provide a corresponding surge protection method for a totem pole PFC which can suitably, reliably, and quickly protect the totem pole PFC from surge voltages.

The solution of this object is solved by the features of the independent claims. The dependent claims contain advantageous embodiments of the present disclosure.

The present disclosure concerns a totem pole PFC with a surge protection circuit. Therein, the totem pole PFC comprises at least one bypass-diode branch with at least two bypass-diodes, at least one switch branch with at least two switches, at least one polarity changer branch with a least two switches, and an input bridge connecting the switch branch(es) with an input voltage source. Further, the totem pole PFC comprises at least one bypass branch connecting the input bridge in parallel with the bypass-diodes of the bypass-diode branch(es). The surge protection circuit comprises at least one current sensor configured to detect a current flowing through at least one of the bypass-diodes of the bypass-diode branch(es). The surge protection circuit also comprises a control unit configured to receive a detected current value from the current sensor(s) and to switch at least one switch of the totem pole PFC at least in dependence on the detected current value.

The totem pole PFC with a surge protection circuit has the advantage that the current sensor(s) can suitably detect a surge voltage by detecting the current flowing through at least one of the bypass-diodes of the bypass-diode branch(es).

In an embodiment, the at least one current sensor is a current transformer, a Hall-effect sensor, further a magneto resistive (AMR) sensor. In addition or alternatively thereto, the at least one current sensor is a shunt resistor (current sensing resistor).

In an embodiment, a current only flows through the bypass-diode branch(es) during and shortly following an initial start-up of the PFC device and when the input voltage source inputs a surge voltage. Therefore, by detecting a current flowing through the bypass-diode branch(es), the present disclosure quickly and reliably detects the occurrence of a surge voltage.

In an embodiment, the term "initial start-up" refers to a state of turning on the device, especially for the first time and/or after having been shut off entirely.

In addition to advantageously detecting and protecting from surge voltages, the surge protection circuit can detect PLDs (power line disturbances) and protect from these accordingly.

In an embodiment, the totem pole PFC comprises, especially at its output, a capacitor which is charged during the start-up process of the totem pole PFC. In an embodiment, a current only flows through the bypass-diode branch(es) during the charging process of the capacitor, when no surge voltage is present. In other words, once the capacitor is fully charged, no current will flow through the bypass-diodes without the presence of a surge voltage during operation of the totem pole PFC.

In an embodiment, the term "no current" means "substantially no current". In other words, small, induced currents, for instance due to electromagnetic interference, are not necessarily excluded by the term "no current". Further, in an embodiment, for example, "no current" means "no intentional current", i.e. the totem pole PFC and surge protection circuit are designed in such a way that no intentional current, for instance via explicit switching of the device to deliver current, flows at the time and/or location to which "no current" refers to.

In an embodiment, the current sensor(s) is/are arranged on the bypass branch. Further, in an embodiment, the current sensor(s) is/are especially arranged on a node of the bypass branch between a connection point of the bypass branch with the input bridge and a connection point of the bypass branch with the bypass-diode branch(es).

In an embodiment, the surge protection circuit comprises a plurality of current sensors. Therein, each bypass-diode of the bypass-diode branch(es) is connected in series with at least one of these current sensors. In an embodiment, each bypass-diode of one or more bypass-diode branches is connected with at least one current sensor of the plurality of current sensors.

Advantageously, at least one bypass-diode branch is connected in parallel with the at least one switch branch. Therein, the one or more current sensors are respectively arranged on nodes between a connection point of the bypass-diode branch(es) with the bypass branch and connection points of the bypass-diode branch(es) with the switch branch(es).

Further, in an embodiment, one first current sensor is arranged on a node between a connection point of the bypass-diode branch with the bypass branch and a connection point of the bypass-diode branch with a high-side switch of at least one of the switch branch(es). Further, in an embodiment, a second current sensor is arranged on a node between a connection point of the bypass-diode branch with the bypass branch and a connection point of the bypass-diode branch with a low-side switch of the switch branch(es).

Advantageously, the totem pole PFC comprises one or more of the aforementioned switch branch(es) and one polarity changer branch. In the case of multiple switch branches, the switch branch closest to the bypass-diode branch(es) may be referred to as a first switch branch, which has direct connection points with the bypass-diode branch(es). The one or more further switch branches may be referred to as second or more switch branches, which have a direct connection point with the first switch branch, and not a direct connection point with one or more or any of the bypass-diode branch(es).

In an embodiment, when the totem pole PFC comprises a plurality of current sensors, at least one current sensor is arranged on each node connecting the connection point of the bypass-diode branch with the bypass-branch with the connection point of the first switch branch, i.e. at least one on the high-side node and the low-side node between the bypass-diode branch and the first switch branch. These current sensors are in addition or alternatively to the at least one current sensor arranged on the bypass branch.

In one advantageous embodiment, the totem pole PFC comprises exactly one bypass-diode branch.

In an embodiment, the totem pole PFC comprises one or more, or two or more, or three or more, or four or more switch branches. In an embodiment, the totem pole PFC comprises exactly one or exactly two or exactly three switch branches. Further, in an embodiment, each switch branch comprises exactly two switches.

Further, in an embodiment, the totem pole PFC comprises exactly one polarity changer branch. Advantageously, the polarity changer branch comprises exactly two switches.

In an embodiment, any or all switches of the totem pole PFC are, especially each, connected to antiparallel diodes. In the exemplary case of MOSFET switches, these are antiparallel body diodes.

In an embodiment, the bypass-diode branch is coupled in parallel with the two switch branches. Further, in an embodiment, the polarity changer branch is coupled in parallel with the switch branches and the bypass-diode branch.

Advantageously, the polarity changer branch is additionally coupled in parallel with the input voltage source, especially via the bypass branch. Further, in an embodiment, the totem pole PFC comprises a polarity changer bridge connecting the polarity changer branch with the input voltage source.

In one embodiment, the control unit comprises a latch for switching off the at least one switch of the totem pole PFC and a latch reset input for resetting the latch. Therein, the latch reset input is especially configured to receive a latch reset signal from a digital signal processor. The digital signal processor is included in the totem pole PFC, particularly in the surge protection circuit of the totem pole PFC.

In an embodiment, the latch is an integrated logic latch. Further, in an embodiment, the latch is a discrete transistor/MOSFET circuit, especially realized with diode feedback. Further, in an embodiment, the latch is an integrated driver, especially wherein self holding is realized with diode feedback.

In an embodiment, the latch is of an edge triggered flip-flop type.

In an embodiment, depending especially on whether the respective switches are normally-on or normally-off switches, the latch actively (via an OFF-signal) switches off the respective switches or passively (via no ON-signal) switches off the switches.

Further, in an embodiment, the control unit comprises a comparator for comparing the detected current with a predetermined protection current value.

In an embodiment, the comparator is an integrated operation amplifier (OPV). Further, in an embodiment, the comparator is an integrated comparator (IC). Further, in an embodiment, the comparator is an integrated driver, especially using a constant input level of a driver.

In an embodiment, the predetermined protection current value is a predetermined value that is higher than a start-up current value of the PFC. For instance, during start-up of the totem pole PFC, a current of for example 30 A may be generated in one or more of the bypass-diodes of the bypass-diode branch. In an embodiment, the predetermined protection current value is set to above 30 A, for example, between 30 A and 100 A. Further, in an embodiment, the predetermined protection current value is below 300 A.

In one advantageous embodiment, the comparator outputs a latch input signal for the latch of the control unit. Thereby, in an embodiment, when the comparator determines that the detected current is equal to or higher than the predetermined protection current value, the comparator outputs the latch input signal, which controls the latch to switch at least one switch of the totem pole PFC.

In an embodiment, the comparator is a Schmitt-trigger or an analog comparator. In the case of the comparator being a Schmitt-trigger, a lower threshold thereof is set to within a predetermined range of the start-up current flowing through the bypass-diode branch. Further, in an embodiment, an upper threshold thereof is set to the predetermined protection current value. Thereby, the comparator does not output the latch input signal during start-up of the totem pole PFC. If the protection circuit is triggered during start-up or PLD (power line disturbances), the control unit recognizes this and resets the latch. The PFC can continue then continue the normal operation.

In an embodiment, the control unit is configured to switch the at least one switch of the totem pole PFC in dependence of the detected current and in dependence on a predetermined time duration after switching on the totem pole PFC. In an embodiment thereby, the surge protection circuit does not switch the at least one switch of the totem pole PFC in reaction to a current flowing through the at least one of the diodes due to the start-up of the device.

In an embodiment, the control unit, especially the latch of the control unit, is configured to switch off all switches of the totem pole PFC. In particular, the control unit is configured to switch off all switches of all switch branches and of all polarity changer branches.

In an embodiment, the aforementioned OFF-switching of the respective switches is achieved by the control unit outputting an active OFF-signal, especially in the preferable case of one or more switches being of the normally-ON type. Alternatively, or in addition thereto, in the preferable case that one or more switches is of the normally-OFF type, the control unit is configured to switch off the respective switch by not supplying an ON-signal and/or ceasing to output an ON-signal.

The present disclosure also concerns a surge protection method for a totem pole PFC. Therein, the totem pole PFC comprises at least one bypass-diode branch with at least two bypass-diodes, at least one switch branch with at least two switches, at least one polarity changer branch with at least two switches, an input bridge connecting the switch branch(es) with an input voltage source, and at least one bypass branch connecting the input bridge in parallel with the bypass-diodes of the bypass-diode branch(es). Therein, the surge protection method comprises the following steps. A current flowing through at least one of the bypass-diodes of the bypass-diode branch(es) is detected and/or measured by at least one current sensor. The detected current value is compared with a predetermined protection current value. If the detected current value is equal to or larger than the protection current value, at least one switch of the totem pole PFC is switched to a switched state, especially to an off state.

In an embodiment, the surge protection method is carried out by the totem pole PFC with the surge protection circuit according to any one of the foregoing embodiments. In particular, the surge protection method is carried out by the control unit of the totem pole PFC with the surge protection circuit according to any one of the foregoing embodiments.

In an embodiment, the surge protection method comprises a step of holding the switched state, for example, the off state, with a latch for a predetermined latch time duration. Therein, the surge protection method comprises the step of resetting the latch after the predetermined latch time duration.

In an embodiment, the surge protection method resets the latch once the detected current value is equal to or less than the protection current value and the latch time duration has passed.

Further, in an embodiment, all switches of the totem pole PFC are switched to an off state if the detected current value is equal to or larger than the protection current value.

In one preferable embodiment, the method comprises a step of waiting for a predetermined time duration after the totem pole PFC has been shut on before carrying out the switching of the at least one switch to an off state. In an embodiment, the step of waiting is carried out by disconnecting at least one of the comparator and the latch of the surge protection circuit from the totem pole PFC.

In an embodiment, the step of holding the off state for a predetermined latch time duration and the comparing of the detected current value with the predetermined protection current value are alternatingly repeated. In other words, in the surge protection method, once the predetermined latch time duration has passed, the surge protection method (again) compares the detected current value with the predetermined protection current value and, if the detected current value is equal to or less than the protection current value, resets the latch. If in this case the detected current value is (still) not equal to or less than the protection current value, the surge protection method does not reset the latch after the predetermined latch time duration. In an embodiment, in the case of the detected current value not being equal to or less than the protection current value, the surge protection method resets the predetermined latch time and holds the off state (again) for the predetermined latch time duration.

In an embodiment, especially alternatively to the aforementioned re-measuring and comparing of the current value, the surge protection method resets the latch after the predetermined latch duration without re-measuring and comparing the current value. Therein, if the current value is (still) equal to or higher than the protection current value, the surge protection method re-latches the switches to the off state.

In an embodiment, resetting the latch enables the normal operation of the totem pole PFC.

BRIEF DESCRIPTION OF DRAWINGS

Further details, advantages, and features of the preferred embodiments of the present disclosure are described in detail with reference to the figures. Therein.

DESCRIPTION OF EMBODIMENTS

Figure 1:
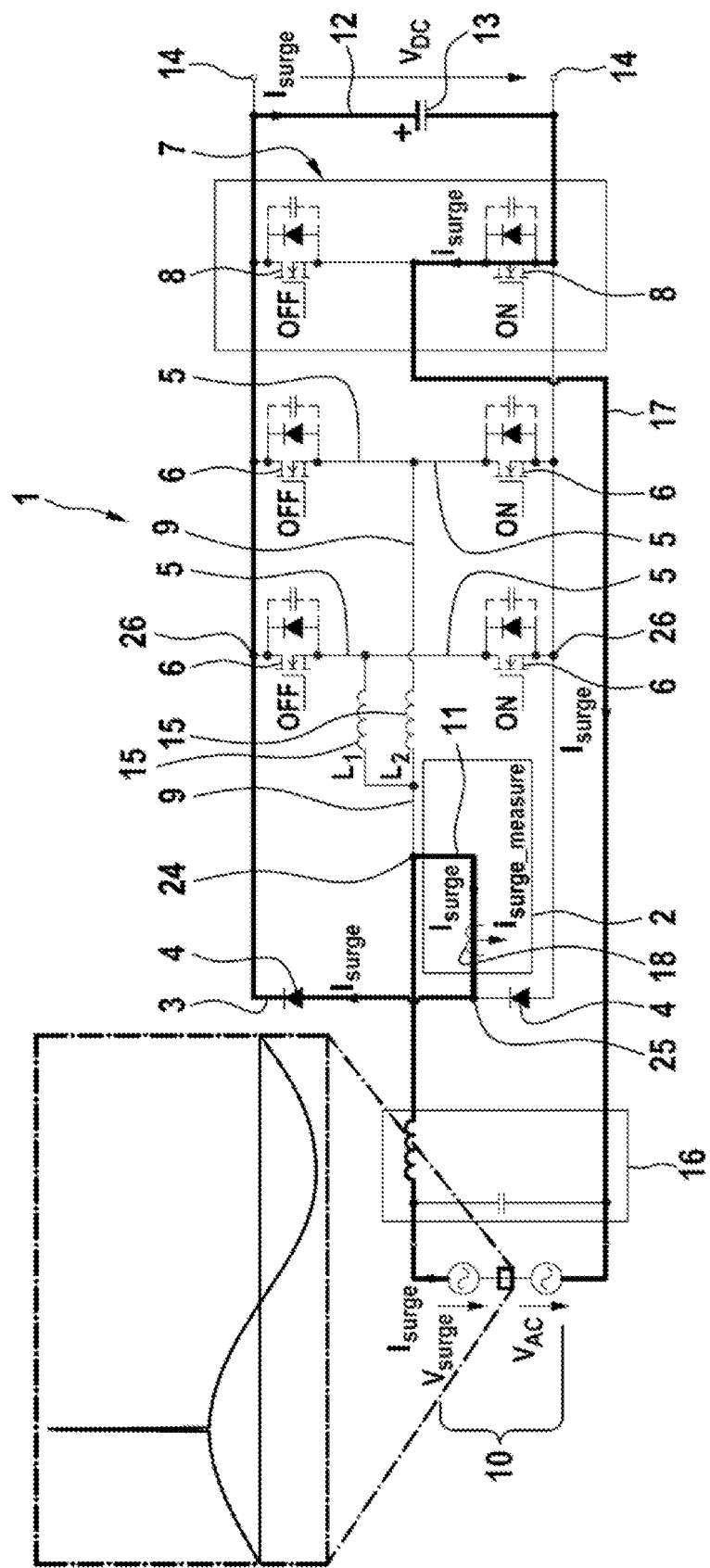
FIG. 1 shows a circuit diagram of a totem pole PFC with a surge protection circuit according to a first embodiment of the present disclosure as well as a schematic diagram of an input surge voltage.
Figure 2:
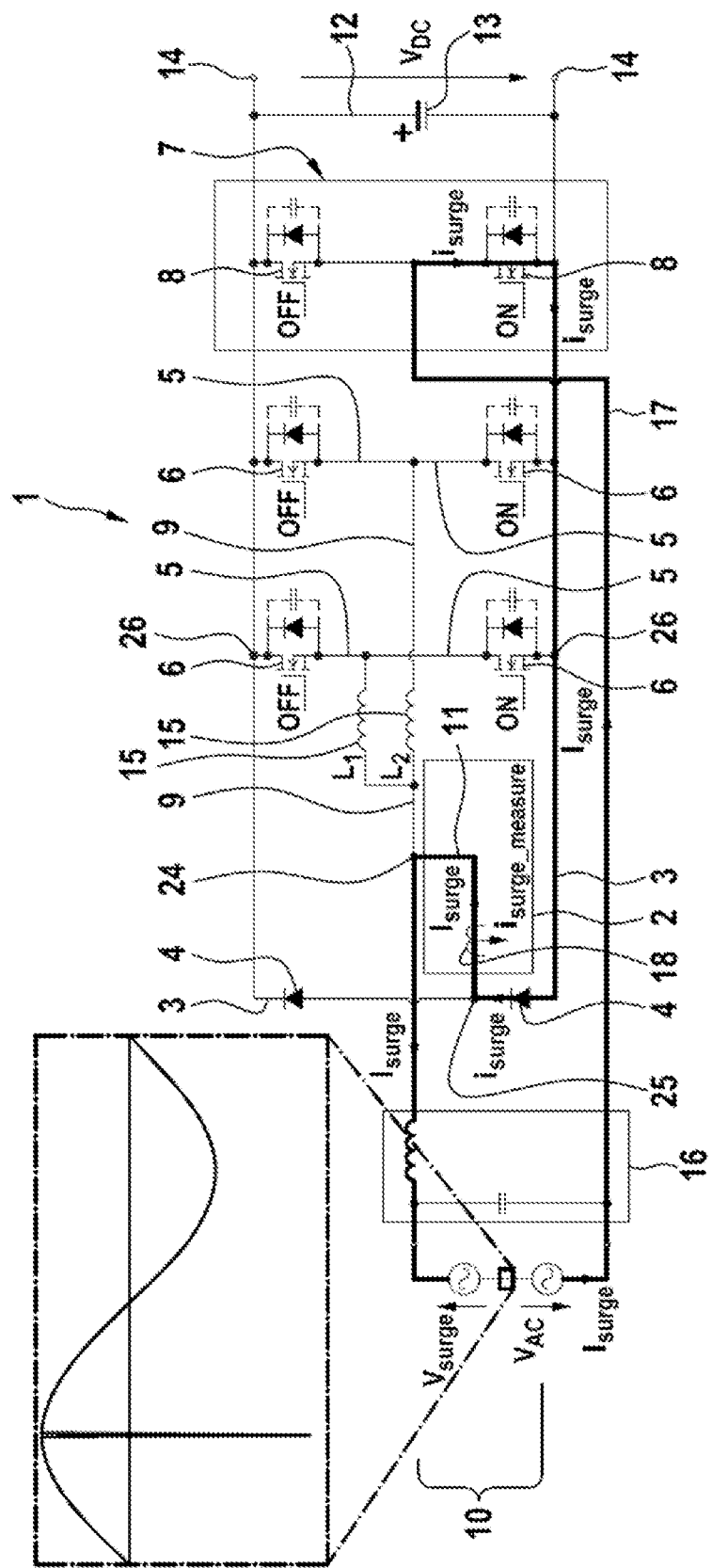
FIG. 2 shows a circuit diagram of the totem pole PFC with the surge protection circuit according to the first embodiment of the present disclosure as well as a schematic diagram of an input surge voltage.
Figure 3:
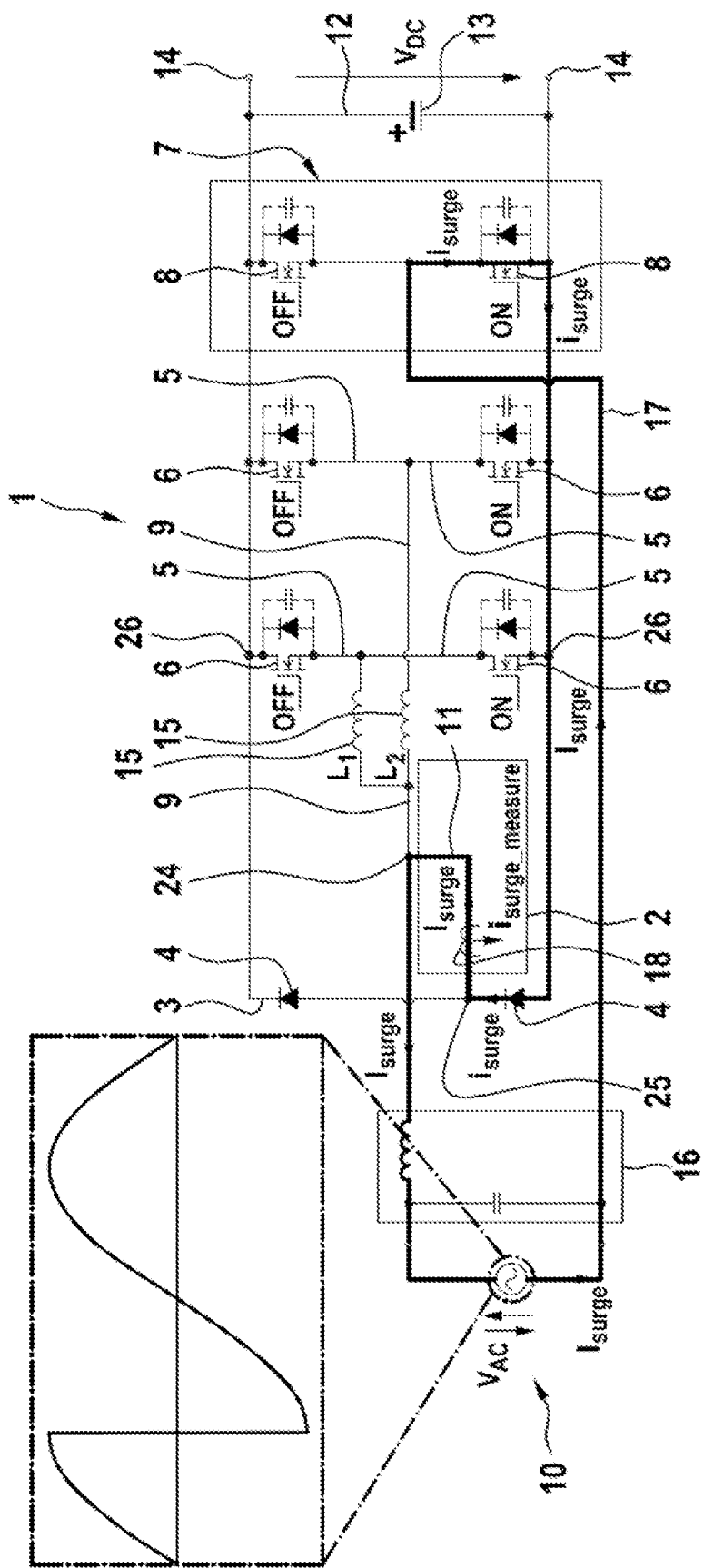
FIG. 3 shows a circuit diagram of the totem pole PFC with the surge protection circuit according to the first embodiment of the present disclosure as well as a schematic diagram of an input surge voltage.
Figure 4:
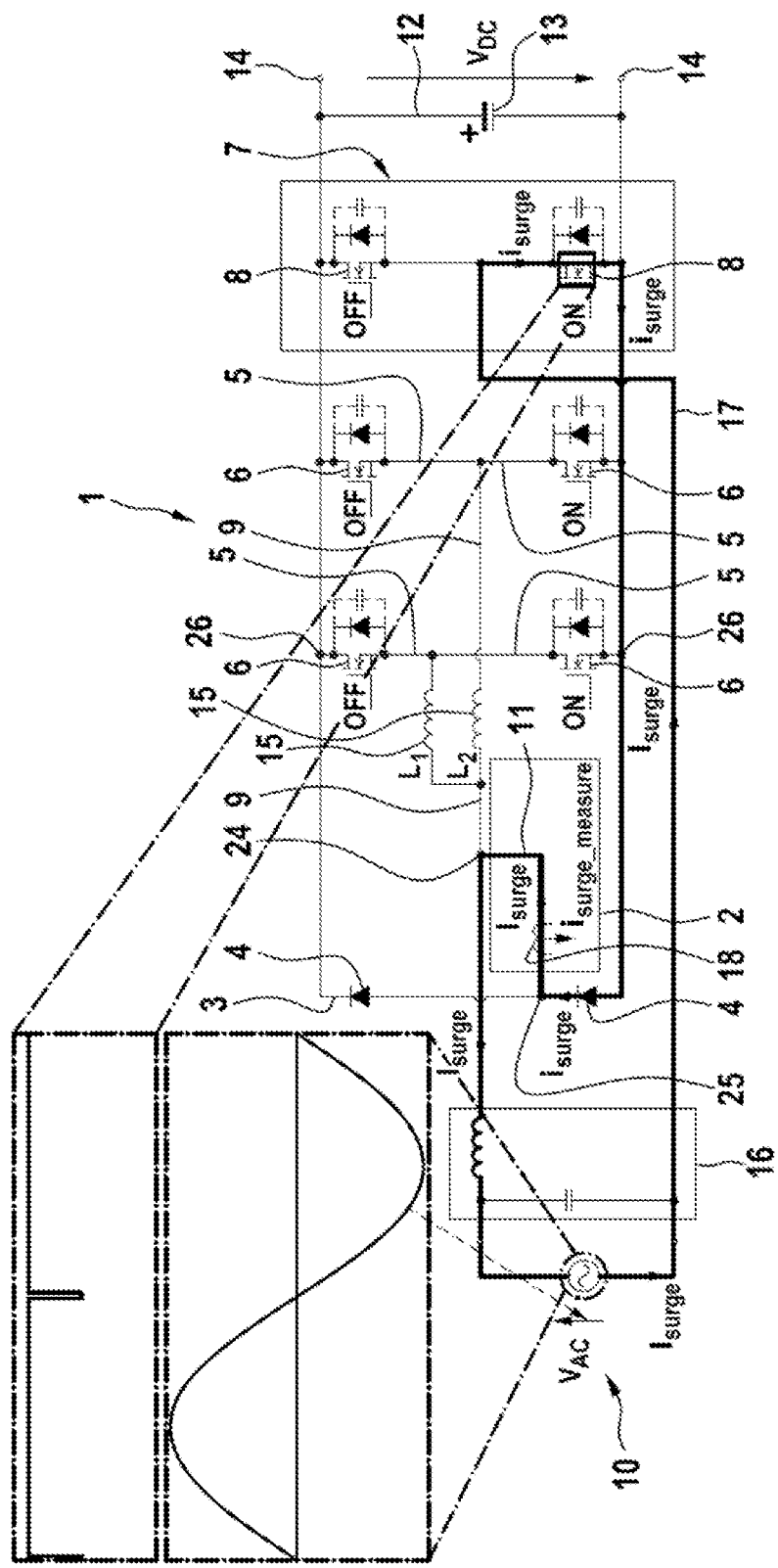
FIG. 4 shows a circuit diagram of the totem pole PFC with the surge protection circuit according to the first embodiment of the present disclosure as well as a schematic diagram of an input surge voltage and of an input signal for a polarity changer of the totem pole PFC.

In particular, FIGS. 1-4 show a first embodiment of a totem pole PFC 1 with a surge protection circuit 2. In FIGS. 1-3, as shown in the inlet diagram thereof, a surge voltage is introduced by an input voltage source 10. In FIG. 4, the inlet shows an incorrect polarity changer 7 switching operation, which also introduces a surge current in the totem pole PFC 1.

As can be taken in detail from the circuit diagram of FIG. 1, the totem pole PFC 1 of this embodiment comprises one bypass-diode branch 3 with two bypass-diodes 4. For the sake of simplicity, the two bypass diodes 4 shown in the figures will be referred to as elements of a single bypass-diode branch 3, with additional coupling or connection points therein (explanation of for example a bypass branch 11 below) not affecting this wording. The same or similar wording will also be used in reference to switch branches 5 and the polarity changer branch 7.

The totem pole PFC 1 comprises one or more switch branches 5. In the present embodiment, the totem pole PFC 1 comprises two switch branches 5. Each of the switch branches 5 comprises two switches 6.

In addition, the totem pole PFC 1 comprises a polarity changer branch 7, which comprises two switches 8 (polarity changer switches 8). The polarity changer branch 7 functions to change the polarity of the signal output by the switch branches 5 to the appropriate DC voltage at a capacity branch 12 with capacity 13 and outputs 14 of the totem pole PFC 1.

Furthermore, the totem pole PFC 1 comprises an input bridge 9, which connects the switch branches 5 respectively with an input voltage source 10. The input bridge 9 includes one inductance branch 15 per switch branch 5, connecting the respective switch branch 5 with the input voltage source 10.

In addition, the totem pole PFC 1 includes an electromagnetic interference filter 16 (EMI-filter 16).

The totem pole PFC 1 further includes a bypass branch 11, which connects the input bridge 9 in parallel with the bypass-diodes 4 of the bypass-diode branch 3. As will be explained in detail below, a current flows through the bypass branch 11 only during startup of the totem pole PFC 1, in particular during a charging operation of a capacitor 13, and when a surge voltage is introduced by the input voltage source 10.

For the following explanation of surge input voltages, it is assumed that the capacitor 13 has already been charged, especially fully charged. In other words, a predetermined startup time has already elapsed.

As shown by the inlet in FIG. 1, the voltage source 10, for instance an electrical grid, introduces an AC voltage. In the case shown in FIG. 1, the voltage source 10 introduces a high surge voltage during a positive phase of the (otherwise regular) AC voltage.

In this case, as shown in FIG. 1, the polarity changer branch 7, via its polarity changer switches 8, is in an intended, or correct state, namely the high-side polarity changer switch 8 being OFF and the low-side polarity changer switch 8 being ON. In this case, "high-side" and "low-side" refer to the polarity of an output signal voltage at the outputs 14 of the totem pole PFC 1.

In the case of the high surge voltage of FIG. 1, a current, namely a surge current, flows through the bypass branch 11. As can be seen in bold in FIG. 1, as well as the indication "$i_{surge}$" therein, the surge current produced by the high surge voltage flows from the voltage source 10, through the bypass branch 11, the high-side bypass-diode 4, the capacitor 13, the low-side polarity changer switch 8, which is in an ON-state, and via a polarity changer bridge 17 to the EMI filter 16 and the voltage source 10.

Thereby, a high surge current flows especially through the low-side switch 8 of the polarity changer branch 7, which can cause a breakdown of the device.

Figure 5:
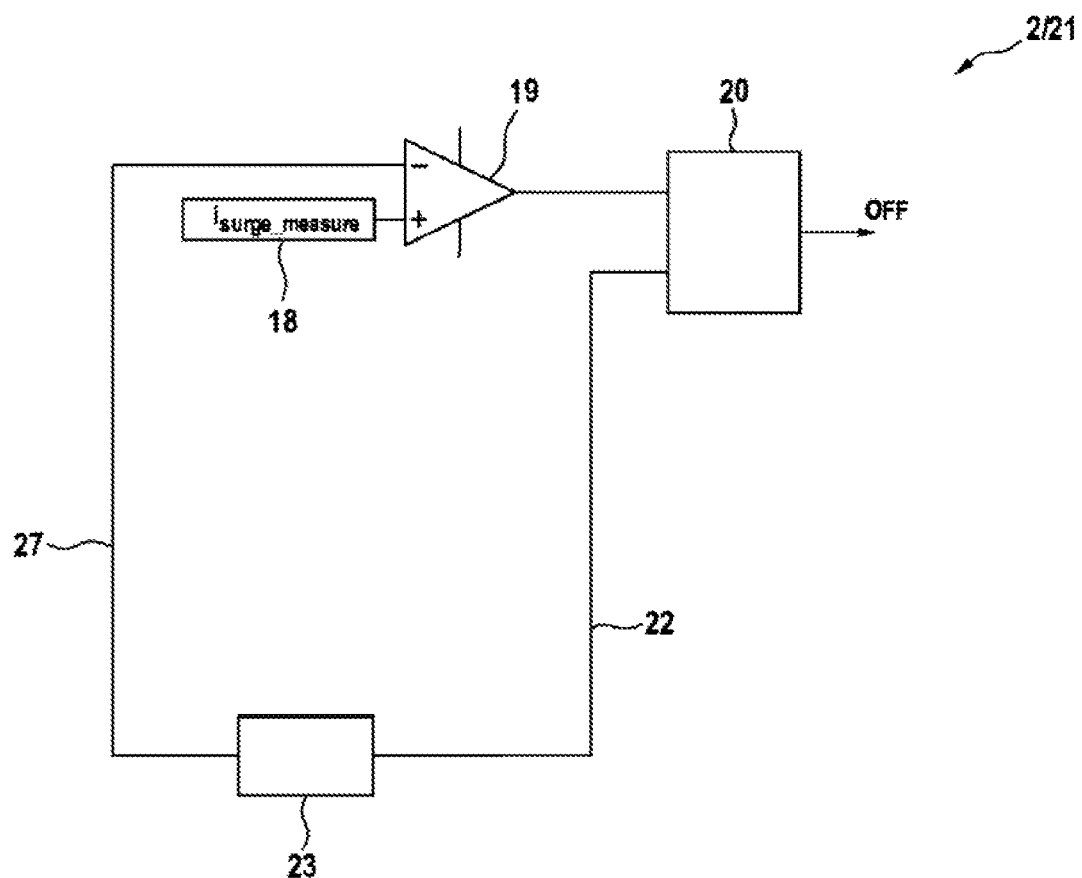
FIG. 5 shows a schematic functional circuit diagram of the surge protection circuit and a control unit of the totem pole PFC with the surge protection circuit according to the first embodiment of the present disclosure.

To mitigate this, the totem pole PFC 1 includes a surge protection circuit 2, which is shown in FIG. 1 and FIG. 5.

FIG. 5 shows a detail functional circuitry diagram of a control unit 21 of the surge protection circuit 2 of the present embodiment. In FIG. 1, a current sensor 18 of the surge protection circuit 2 is shown. In the present embodiment, the current sensor 18 is arranged on the bypass branch 11.

In an embodiment, the current sensor 18 is arranged on a node of the bypass branch 11 between a first connection point 24 of the bypass branch 11 with the input bridge 9 and a second connection point 25 of the bypass branch 11 with the bypass-diode branch 3.

The control unit 21 comprises a comparator 19, especially a hardware-based comparator, which compares a current measured by the current sensor 18 (see also FIG. 1), with a predetermined protection current value 27. The current measured by the current sensor 18 is shown in FIG. 5 as "$i_{surge\_measure}$".

The predetermined protection current value 27 is a current value, especially an absolute value, with which (and/or above which) damage to and/or breakdown of the totem pole PFC 1 may be caused by the surge current. This protection current value 27 is input to the comparator 19 via a signal processing unit 23, and is especially set to a constant value.

In an embodiment, the signal processing unit 23 is an element of the totem pole PFC 1 and/or of the surge protection circuit 2. In an embodiment, the signal processing unit 23 is further configured to control the totem pole PFC 1, especially during normal operation. Further, in an embodiment, the signal processing unit 23 is a part of the control unit 21 or is a unit which is separate from the control unit 21. In an embodiment, the signal processing unit 23 is a digital signal processor.

Further, the control unit 21 of the surge protection circuit 2 comprises a latch 20, wherein the comparator 19 inputs a latch signal into the latch 20 when the current measured by the current sensor 18, i.e. when the detected "$i_{surge\_measure}$" current, is equal to or higher than the predetermined protection current value 27.

The latch 20 is further configured to output an OFF signal to, in this embodiment, all switches 6, 8 of the totem pole PFC 1. Thereby, all switches 6, 8, including those of the switch branches 5 and those of the polarity changer branch 7, are switched to an OFF state. In this regard, depending on whether the respective switches are normally-on or normally-off switches, the latch 20 can actively (via an OFF-signal) switch off the switches or passively (via no ON-signal) switch off the switches 6, 8.

Thereby, the surge protection circuit 2 reliably and quickly switches off all switches 6, 8 so as to protect the totem pole PFC 1 from breakdown during occurrence of a surge voltage.

Further, the signal processing unit 23 is configured to output a latch reset signal 22 into the latch 20 so as to reset the latch 20 and thereby revert to a normal operation of the totem pole PFC 1.

The signal processing unit 23 is especially configured to output the latch reset signal 22 after a predetermined latch time duration. After this latch time duration, the signal processing unit 23 outputs the latch reset signal 22. Then, if the current detected by the current sensor 18 is below the protection current value 27, normal operation of the totem pole PFC 1 resumes. On the other hand, if the current detected by the current sensor 18 is (still or again) equal to or higher than the protection current value 27, the latch 20 will again latch and switch off all switches 6, 8.

As explained above, during normal startup operation of the totem pole PFC 1, when the capacitor 13 is being charged, a current will flow through the bypass-diodes 4 and the current sensor 18.

In an embodiment, in order to prevent the latch 20 from switching off the switches 6, 8 during normal startup operations (i.e. no surge voltage input via the input voltage source), the control unit 21 and/or the signal processing unit 23 are configured to set the protection current value 27 to an appropriate level equal to or above a startup current surge value flowing during the normal startup operation.

In addition or alternatively thereto, the control unit 21 and/or the signal processing unit 23 are configured to switch, especially via the latch 20, the switches 6, 8 in dependence on a predetermined time duration after switching on the totem pole PFC 1. In an embodiment, the predetermined time duration is the time necessary for at least partially, especially fully, charging the capacitor 13 after initial startup of the totem pole PFC 1.

To achieve this, the control unit 21 and/or the signal processing unit 23 are configured to disconnect at least one of the comparator 19 and the latch 20 for the predetermined time duration. In an embodiment, the signal processing unit 23 is configured to output a constant latch reset signal to the latch 20 during the predetermined startup time duration, so as to prevent the latch 20 from latching.

In an embodiment, the comparator 19 is a Schmitt-trigger with a lower threshold and a higher threshold. In this case, the lower threshold is set to at least the startup surge current flowing through the bypass-diodes 4 during startup operation of the totem pole PFC 1. For example, this current is roughly 30 A, but may be higher or lower depending on the device characteristics and use-case. Further, the upper threshold is set to the predetermined protection current value. Thereby, the Schmitt-trigger only outputs the latch signal (for instance, a high signal, i.e. "1") once the upper threshold, i.e. the protection current value, has been reached, and outputs no latch signal (for instance, a low signal, i.e. "0") once the detected current is below the startup surge current.

In an embodiment, an output of the comparator 19 is input to the signal processing unit 23, which in turn outputs the latch signal to the latch 20. In this case, the signal processing unit 23 outputs the latch signal to the latch 20 when the comparator 19 outputs a high signal, and outputs the latch reset signal to the latch 20 when the comparator 19 outputs a low signal.

Thereby, the surge protection circuit 2 suitably and reliably protects the totem pole PFC 1 from overcurrent caused by the surge voltage input by the input voltage source 10. Due to the charged capacitor 13, an interruption of output of the totem pole PFC 1 can be prevented during the surge protection.

FIG. 2 shows a schematic circuit diagram of the totem pole PFC 1 with the surge protection circuit 2 according to the first embodiment of the present disclosure as well as a schematic diagram of an input surge voltage.

As can be taken from the inlet of FIG. 2, in this example, the input voltage source 10 inputs a negative or low surge voltage during a (normally) positive phase of the input AC voltage. In this case, due to the phase of the input AC voltage being positive before the low surge, the polarity changer branch 7 is switched as in the case of FIG. 1. Therein, the high-side polarity switch 8 is OFF, whereas the low-side polarity switch 8 is ON.

In this case, the generated surge current "$i_{surge}$" flows from the voltage source 10, through the polarity changer bridge 17, through the low-side polarity switch 8, which is ON, through the low-side bypass-diode 4 and through the bypass branch 11 back to the voltage source 10. Thereby, especially the low-side polarity switch 8 can be damaged due to the high surge current flowing therethrough. This is prevented via the surge protection circuit 2 described above, since the surge current flows through the bypass branch 11 on which a current sensor 18 is arranged.

FIG. 3 shows a further example of a surge voltage. In this case, the input voltage source 10 inputs a negative or low surge voltage during a (normally) positive phase of the input AC voltage, wherein it abruptly switches to the negative phase of the AC voltage, such that the AC voltage is in the negative phase after the surge voltage.

In this case, due to the initial positive phase of the input AC voltage, the polarity changer branch 7 is switched as in FIG. 1 and FIG. 2. However, due to the abrupt switch to the negative phase of the input AC voltage, the polarity changer branch 7 is thereby essentially in a faulty switching configuration. In contrast to the case shown in FIG. 3, under normal operation, during the negative phase, the low-side polarity changer switch 8 should be OFF, whereas the high-side polarity changer switch 8 should be ON.

Therefore, a surge or short current flows, from the voltage source 10 through the polarity changer bridge 17, through the low-side polarity changer switch 8, which is ON, through the low-side bypass-diode 4, and through the bypass branch 11 back to the voltage source 10. Thereby, especially the low-side polarity switch 8 can be damaged due to the high surge current flowing therethrough. This is prevented via the surge protection circuit 2 described above, since the surge current flows through the bypass branch 11 on which a current sensor 18 is arranged.

FIG. 4 shows a schematic circuit diagram of the totem pole PFC 1 with the surge protection circuit 2 according to the first embodiment of the present disclosure as well as a schematic diagram of an input surge voltage and of an input signal for a polarity changer 7 of the totem pole PFC 1.

In the example shown in FIG. 4, instead of the input voltage source 10 inputting a surge voltage, a switching operation of the polarity changer branch 7 is erroneous.

In the inlet of FIG. 4, the input voltage (bottom of inlet) is shown as well as a control signal for the polarity changer branch 7 (top of inlet). Therein, a positive signal corresponds to the low-side polarity changer switch 8 being ON, and a negative signal corresponds to the low-side polarity changer switch 8 being OFF, with the high-side polarity changer switch 8 being respectively switched in the opposite manner.

Under normal operation, as also explained above with respect to FIG. 1 to FIG. 3, the high-side polarity changer switch 8 switches from OFF to ON when the AC input voltage switches from positive to negative, and the low-side polarity changer switch 8 switches from ON to OFF. In other words, during positive phase of the AC input voltage, the high-side polarity changer switch 8 should be in the OFF state (as shown in FIG. 1 to FIG. 3, wherein switching is carried out correctly), and the low-side polarity changer switch 8 should be in the ON state.

Therefore, in this case of FIG. 4, the high-side polarity changer switch 8 should be in the ON state, due to the negative phase of the input AC voltage being reached. The low-side polarity changer switch 8 should correspondingly be in the OFF state. Herein, however, the low-side polarity changer switch 8 switches erroneously back to the ON state. This is shown in the horizontal middle of the top inlet of FIG. 4, in which the switch signal for the low-side polarity changer switch 8 switches first from the positive signal (corresponding to ON) to the negative signal (corresponding to OFF), which is correct, but subsequently erroneously switches back to the positive signal (corresponding to ON), as shown in the circuit diagram of FIG. 4.

In this case, a surge current flows in the same manner as shown in FIG. 3. This is due to the fact that the erroneous switching of FIG. 4 is essentially equal to correct switching in the case of a reverse surge voltage being introduced by the AC voltage, which is shown in FIG. 3. Thereby, especially the low-side polarity switch 8 can be damaged due to the high surge current flowing therethrough. This is prevented via the surge protection circuit 2 described above, since the surge current flows through and is detected on the bypass branch 11 on which a current sensor 18 is arranged.

Thus, in any one of the cases described above, as well as corresponding cases of surge voltages and/or faulty switching of the polarity changer 7, the surge protection circuit 2 can protect the switches 6, 8 of the totem pole PFC 1 from overcurrent and potential breakdown thereof.

Figure 6:
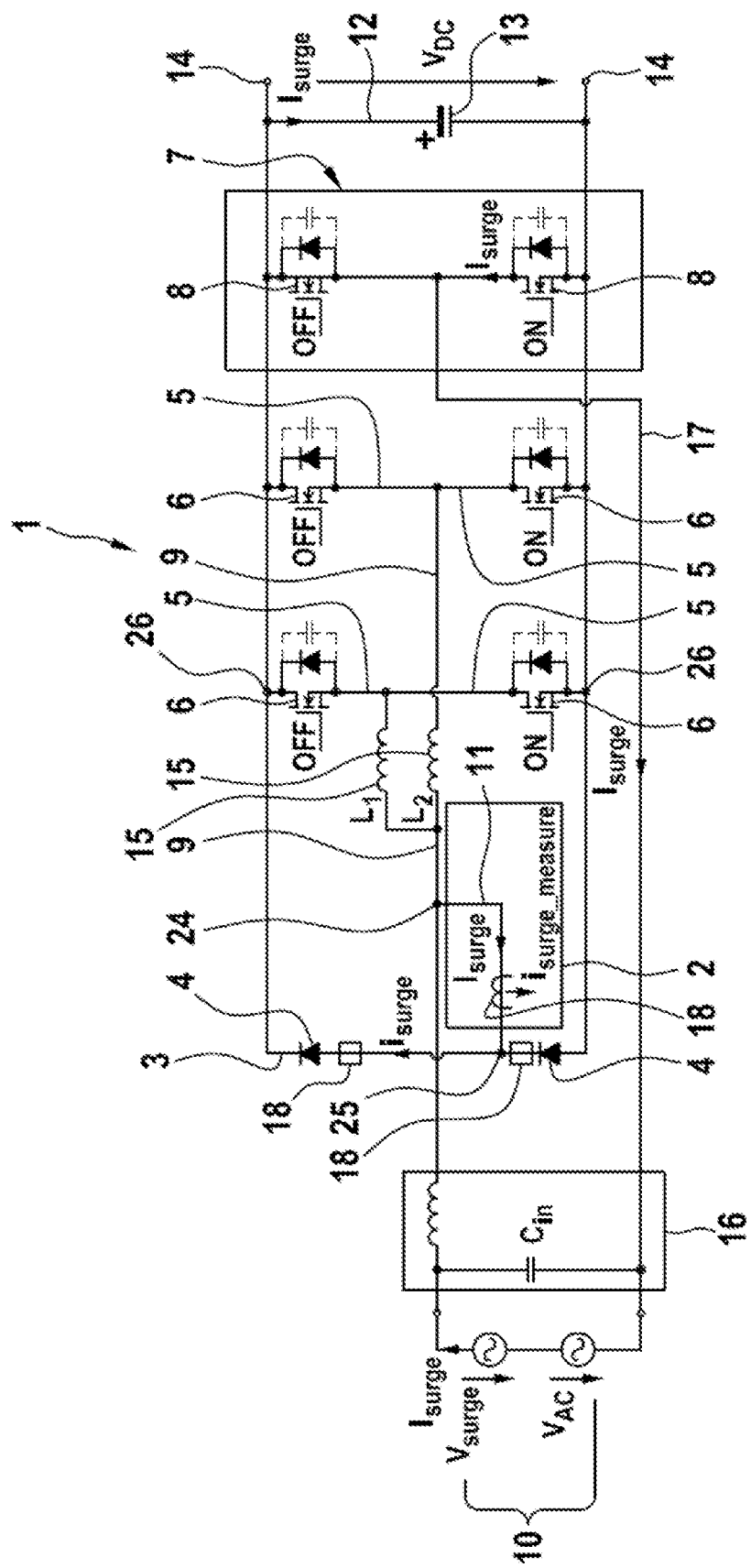
FIG. 6 shows a circuit diagram of a totem pole PFC with a surge protection circuit according to a second embodiment of the present disclosure.

FIG. 6 shows a second preferable embodiment of the totem pole PFC 1 with the surge protection circuit 2.

In particular, FIG. 6 shows an alternative or additional arrangement of current sensors 18 as compared with FIG. 1 to FIG. 4. In an embodiment, the second embodiment includes the control unit 21 and/or the digital signal processor 23 of the surge protection circuit 2 described above, especially with reference to FIG. 1 and FIG. 5.

Herein, the surge protection circuit 2 comprises two additional current sensors 18, each detecting a current flowing through one of the high-side and the low-side bypass-diodes 4. In the preferable case that the surge protection circuit 2 comprises only these two additional current sensors 18, especially without the current sensor 18 on the bypass branch 11, the surge protection circuit 2 can further reliably detect and protect from all cases of surge voltage, since the surge current always flows through one of the bypass-diodes 4.

In an embodiment, these current sensors 18 are each connected in series with one bypass-diode 4.

As can be taken from FIG. 1 to FIG. 4 and FIG. 6, the bypass-diode branch 3 is connected in parallel with the at least one (in this case exactly two) switch branch(es) 5. Thereby, third connection points 26 of the bypass-diode branch 3 with the switch branches 5 are formed. In an embodiment, the current sensors 18 are arranged on nodes between the second connection point 25 of the bypass branch 11 with the bypass-diode branch 3 and the respective third connection points 26. In an embodiment, a first current sensor 18 is provided on the node between the second connection point 25 and a low-side third connection point 26. Further, a second current sensor 18 is provided on the node between the second connection point 25 and a high-side third connection point 26.

Furthermore, the control unit 21 comprises two or more comparators 19 and/or two or more latches 20 to account for the plurality of current sensors 18.

In addition or alternatively thereto, the control unit 21 comprises at least one combiner circuit which combines the current value outputs from the different current sensors 18, especially to a common signal for the comparator 19. In addition or alternatively thereto, the control unit 21 comprises at least one combiner circuit which combines the comparator 19 output signals corresponding to multiple comparators 19 for the latch 20, especially to a common signal for the latch 20.

The foregoing described configuration of the two current sensors 18 is to be understood as in addition or alternatively to the current sensor 18 arranged on the bypass bridge 11.

Figure 7:
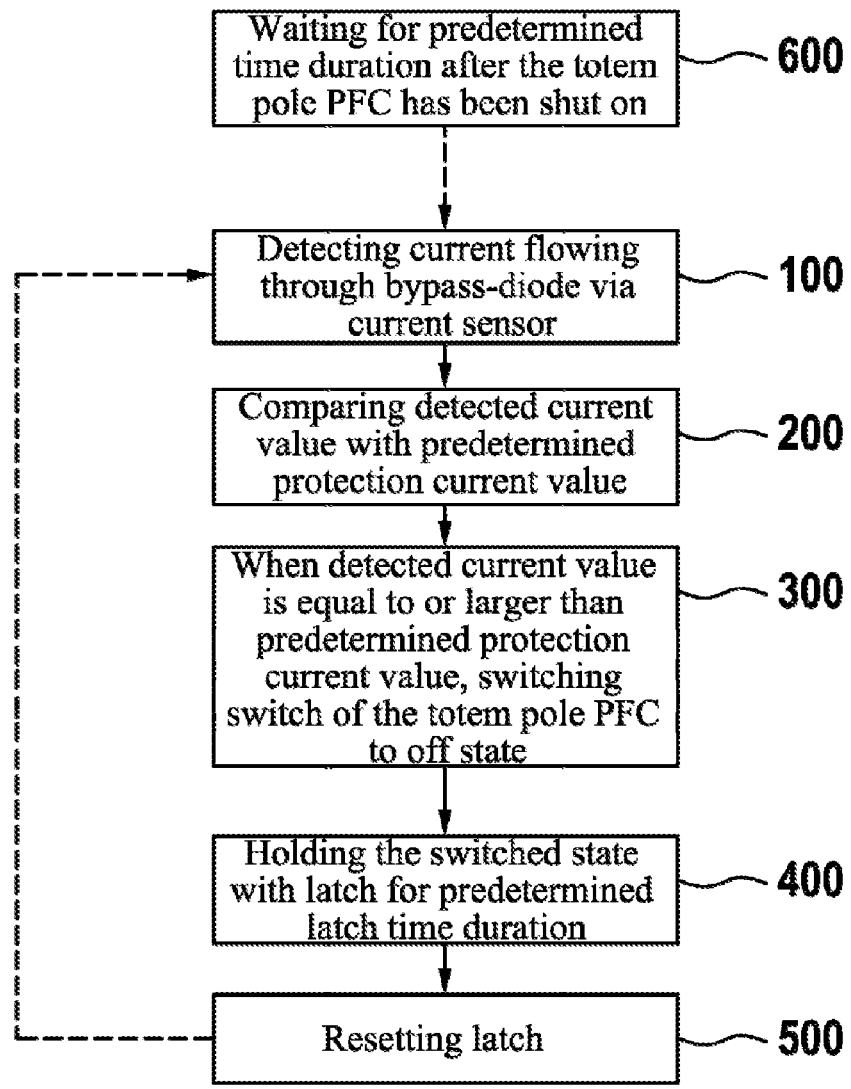
FIG. 7 shows a schematic block diagram of a surge protection method according to an embodiment of the present disclosure.

FIG. 7 shows a schematic block diagram of a surge protection method for a totem pole PFC 1 according to one embodiment of the present disclosure. In an embodiment, the surge protection method is carried out on/with the totem pole PFC 1 described above with respect to FIG. 1 to FIG. 6, the case of which will be described below. Therein, any of the foregoing embodiments and examples explaining functional configurations of the totem pole PFC 1 and/or the surge protection circuit 2 and/or the control unit 21 and/or the digital signal processor 23 are also to be understood as preferable embodiments and examples of the surge protection method for the totem pole PFC 1.

In an embodiment, the surge protection method is separate from, especially in addition to, a normal operating method of the PFC 1, i.e. a power factor correction method of driving the switches 6, 8 in reaction to a (normal, non surged) input voltage.

The surge protection method comprises a step 100 of measuring, via at least one current sensor 18, a current flowing through at least one of the bypass-diodes 4 of the bypass-diode branch 3.

Further, the surge protection method comprises a step 200 of comparing the current value detected 100 by the current sensor(s) 18 with a predetermined protection current value 27. The step 200 is especially carried out using the comparator 19.

The surge protection method additionally comprises a step 300, in which, if the detected current is equal to or larger than the protection current value 27, at least one switch 6, 8 of the totem pole PFC 1 is switched to an OFF state. In particular, this switching operation 300 is carried out only if the detected current is equal to or larger than the protection current value. In an embodiment, this switching operation does not correspond to a (normal) switching operation of the switches 6, 8 for the usual operation, i.e. the power factor correction by the PFC 1.

In an embodiment, the switching operation 300 switches off all switches 6, 8.

The surge protection method according to the present embodiment further comprises a step 400 of holding the off state, especially with a latch 20, for a predetermined latch time duration.

In an embodiment, the latch time duration is between and including 50 μs and 100 μs.

Additionally, the surge protection method comprises a step 500 of resetting the latch 20, especially after the predetermined latch time duration has passed and when the detected current value is equal to or less than the protection current value 27.

For the possible case that the detected current value is not equal to or less than the protection current value 27 after the predetermined latch duration, i.e. when the latch 20 has been reset in step 500, the surge protection method comprises an additional preferable loop back to step 100. Therein, during and/or after resetting 500 the latch 20, the surge protection method again detects or measures (step 100) a current via the current sensor(s) 18 and repeats steps 200-500.

In addition, the surge protection method comprises an optional, preferable step 600. The step 600 comprises waiting for a predetermined time duration after the totem pole PFC 1 has been shut on before carrying out the switching off of any or all switches 6, 8 in reaction to a surge current. This optional step 600 may be carried out before step 100, such that the surge protection method with steps 100-500 is started only after the predetermined time duration. In addition or alternatively thereto, the optional step 600 is carried out before the switching step 300, after the detection step 100 and/or after the comparing step 200.

As elucidated above with respect to FIG. 1, in addition or alternatively to the optional step 600, the surge protection method sets the predetermined protection current value 27 as higher than a (typical) surge current (startup surge current), for example higher than 30 A, so as to only switch off the switch(es) 6, 8 when the surge current is higher than the startup surge-current.

The aforementioned surge protection method is carried out by the surge protection circuit 2, in particular by the control unit 21 and/or preferably by the signal processing unit 23.

With the surge protection method of the present embodiment, it is possible to reliably and quickly protect the totem pole PFC 1 from damages or breakdown resulting from surge voltages and/or surge currents and/or PLDs (power line disturbances).

In addition to the foregoing written explanation of the disclosure, it is explicitly referred to FIGS. 1 to 7, which in detail show features of the disclosure. The figures in detail show especially technical details on the circuitry configuration, particularly parallel and series connections, of the branches and elements described in the foregoing. It should, however, be emphasized that the circuitry configurations shown in the figures, in the technical sense, also encompass their equivalents via so-called "redrawing" or "simplifying" of these circuit schematics.

What is claimed is:

1. A totem pole power factor correction circuit (PFC) with a surge protection circuit, comprising:

at least one bypass-diode branch with at least two bypass-diodes;

at least one switch branch with at least two switches;

at least one polarity changer branch with at least two switches;

an input bridge connecting the switch branch(es) with an input voltage source;

at least one bypass branch connecting the input bridge in parallel with the bypass-diodes of the bypass-diode branch(es);

the surge protection circuit comprising: at least one current sensor configured to detect a current flowing through at least one of the bypass-diodes of the bypass-diode branch(es); and a controller configured to receive a detected current value from the current sensor(s) and to switch at least one switch of the totem pole PFC at least in dependence on the detected current value;

wherein the controller comprises a digital signal processor configured to switch the at least one switch of the totem pole PFC in dependence on the detected current value and in dependence on a predetermined time duration after switching on the totem pole PFC.

2. The totem pole PFC according to claim 1, wherein the controller further comprises:

a comparator, configured to compare the detected current value with a predetermined protection current value; and a latch, configured to switching off the at least one switch of the totem pole PFC and a latch reset input for resetting the latch.

3. The totem pole PFC according to claim 2, wherein the comparator is configured to output a latch input signal to the latch when the detected current value is equal to or higher than the predetermined protection current value, the latch is configured to switch off at least one switch of the switch branch and the polarity changer branch according to a latch signal.

4. The totem pole PFC according to claim 3, wherein the digital signal processor is further configured to provide a latch reset input to the latch when the detected current value is equal to or less than a protection current value and the predetermined time duration has passed.

5. The totem pole PFC according to claim 2, wherein the surge protection circuit is further configured to prevent a current from flowing through the bypass-diode branch(es) when the detected current value is equal to or higher than the predetermined protection current value.

6. The totem pole PFC according to claim 2, wherein the predetermined protection current value is higher than a start-up current value of the PFC.

7. The totem pole PFC according to claim 1, wherein the digital signal processor is configured to maintain all switches of the switch branch and the polarity changer branch in an off state for the predetermined time duration when the detected current value is equal to or higher than the predetermined protection current value.

8. The totem pole PFC according to claim 1, wherein the surge protection circuit is further configured to enable that at least one bypass branch has a current flowing through only during startup of the totem pole PFC, a charging operation of the totem pole PFC, or when a surge voltage is introduced.

9. The totem pole PFC according to claim 1, wherein the at least one bypass-diode branch is connected in parallel with the at least one switch branch.

10. The totem pole PFC according to claim 1, wherein the current sensor(s) is/are arranged between a plurality of nodes of the bypass branch and the bypass-diode branch(es).

11. The totem pole PFC according to claim 10, wherein the current sensors are respectively arranged on nodes between a connection point of the bypass branch with the bypass-diode branch(es) and connection points of the bypass-diode branch(es) with the switch branch(es).

12. The totem pole PFC according to claim 10, wherein the current sensor(s) is/are respectively arranged on a node of the bypass branch between a connection point of the bypass branch with the input bridge and a connection point of the bypass branch with the bypass-diode branch(es).

13. The totem pole PFC according to claim 10, wherein a plurality of current sensors are provided, and each bypass-diode of the bypass-diode branch(es) is connected in series with at least one of the plurality of current sensors.

14. A surge protection method for a totem pole PFC, wherein the totem pole PFC comprises at least one bypass-diode branch with at least two bypass-diodes, at least one switch branch with at least two switches, at least one polarity changer branch with at least two switches, an input bridge connecting the switch branch(es) with an input voltage source, and at least one bypass branch connecting the input bridge in parallel with the bypass-diodes of the bypass-diode branch(es), the surge protection method comprising:

detecting, via at least one current sensor, a current flowing through at least one of the bypass-diodes of the bypass-diode branch(es);

comparing a detected current value with a predetermined protection current value;

when the detected current value is equal to or larger than the predetermined protection current value, switching at least one switch of the totem pole PFC to an off state;

wherein the surge protection method further comprises:

waiting for a predetermined time duration after the totem pole PFC has been shut on and before carrying out the switching of the at least one switch to the off state.

15. The surge protection method according to claim 14, further comprising:

holding the switched state with a latch for a predetermined latch time duration, and resetting the latch after the predetermined latch time duration.

16. The surge protection method according to claim 15, wherein all switches of the totem pole PFC are switched to the off state for the predetermined latch time duration when the detected current value is equal to or larger than the predetermined protection current value.

17. The surge protection method according to claim 15, wherein a step of resetting the latch comprises after the predetermined latch time duration has passed, and when the detected current value is equal to or less than the predetermined protection current value, resetting the latch.

18. The surge protection method according to claim 14, further comprising causing the current to flow through the at least one the bypass branch when the detected current value is equal to or greater than the predetermined protection current value.

* * * * *